United States Patent
Du et al.

(10) Patent No.: US 12,219,536 B2
(45) Date of Patent: Feb. 4, 2025

(54) SYSTEMS AND METHODS FOR CONNECTING TO A WIRELESS NETWORK

(71) Applicant: ZHEJIANG DAHUA TECHNOLOGY CO., LTD., Zhejiang (CN)

(72) Inventors: Long Du, Hangzhou (CN); Hui Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 545 days.

(21) Appl. No.: 17/645,773

(22) Filed: Dec. 23, 2021

(65) Prior Publication Data
US 2022/0116945 A1    Apr. 14, 2022

Related U.S. Application Data

(63) Continuation of application No. PCT/CN2019/126519, filed on Dec. 19, 2019.

(30) Foreign Application Priority Data

Jul. 10, 2019  (CN) .......................... 201910619597.0

(51) Int. Cl.
*H04W 24/08* (2009.01)
*G08B 21/00* (2006.01)
(Continued)

(52) U.S. Cl.
CPC ......... *H04W 72/0446* (2013.01); *H04L 69/14* (2013.01); *H04W 84/12* (2013.01)

(58) Field of Classification Search
CPC . H04W 48/20; H04W 72/0446; H04W 24/08; H04W 84/12; H04B 17/309;
(Continued)

(56) References Cited

U.S. PATENT DOCUMENTS 10,152,479 B1 * 12/2018 Granström ............ G06F 16/483
2011/0025499 A1 * 2/2011 Hoy .......................... G08B 1/08
340/540

(Continued)

FOREIGN PATENT DOCUMENTS

CN   103475653 A   12/2013
CN   103595729 A   2/2014
(Continued)

OTHER PUBLICATIONS

International Search Report in PCT/CN2019/126519 mailed on Apr. 8, 2020, 4 pages.

(Continued)

*Primary Examiner* — Edan Orgad
*Assistant Examiner* — Vanneilian Lalchinthang
(74) *Attorney, Agent, or Firm* — METIS IP LLC

(57) ABSTRACT

The present disclosure relates to systems and methods for connecting to a wireless network. The methods may include obtaining, within a dwell time, at least one packet transmitting on a current channel among a plurality of predetermined channels, wherein the plurality of predetermined channels at least include a target channel on which a connection to the wireless network is to be established; determining a matching score of the current channel based on the at least one packet, wherein the matching score reflects a likelihood that the current channel is the target channel; and determining, based on the matching score, an additional dwell time for continuing dwelling on the current channel to further evaluate the likelihood that the current channel is the target channel.

20 Claims, 7 Drawing Sheets

(51) Int. Cl.
*H04L 12/26* (2006.01)
*H04L 69/14* (2022.01)
*H04W 72/0446* (2023.01)
*H04W 84/12* (2009.01)

(58) Field of Classification Search
CPC ....... H04B 17/382; H04L 69/14; H04L 69/18; H04R 29/00; G08B 3/10; G08B 1/08; G10L 19/038; G10L 25/51; G06F 16/683
USPC .......................................................... 370/336
See application file for complete search history.

(56) References Cited

U.S. PATENT DOCUMENTS

| | | | |
|---|---|---|---|
| 2013/0254223 A1* | 9/2013 | Lau .................... | G06F 16/48 707/769 |
| 2014/0204917 A1 | 7/2014 | Lee et al. | |
| 2014/0241207 A1* | 8/2014 | Zhang .................. | H04W 8/005 370/254 |
| 2014/0362420 A1* | 12/2014 | Borges ................ | H04W 4/70 358/474 |
| 2015/0103680 A1* | 4/2015 | Anand ................ | H04W 72/569 370/336 |
| 2015/0133058 A1* | 5/2015 | Livis .................... | H04B 1/719 455/67.11 |
| 2016/0314379 A1* | 10/2016 | Wong .................. | G06V 10/761 |
| 2019/0318092 A1* | 10/2019 | Haug .................. | G06F 21/566 |
| 2020/0112755 A1* | 4/2020 | Seshadri ............ | G06N 3/045 |

FOREIGN PATENT DOCUMENTS

| | | | | |
|---|---|---|---|---|
| CN | 104038389 A | 9/2014 | | |
| CN | 103560958 B | 1/2017 | | |
| CN | 106454812 A | 2/2017 | | |
| CN | 106878307 A | 6/2017 | | |
| CN | 108134801 A | 6/2018 | | |
| CN | 108289023 A | 7/2018 | | |
| CN | 109219075 A | * | 1/2019 | ........... H04B 17/309 |
| CN | 109922498 A | 6/2019 | | |
| CN | 109922516 A | 6/2019 | | |
| WO | 2021004014 A1 | 1/2021 | | |

OTHER PUBLICATIONS

Written Opinion in PCT/CN2019/126519 mailed on Apr. 8, 2020, 5 pages.

First Office Action in Chinese Application No. 201910619597.0 mailed on Mar. 25, 2020, 14 pages.

Budoor Bawazeer et al., Reducing Scanning Delay for WiFi-to-WhiteFi Handovers, Fifth International Conference on Digital Information & Communication Technology & Its Applications, 49-53, 2015.

Tian, Lina, The Principle and Application of WiFi Connection SmartConfig, China Computer & Communication, 20:152-154, 2018.

The Extended European Search Report in European Application No. 19937037.0 mailed on Jul. 6, 2022, 10 pages.

* cited by examiner

SYSTEMS AND METHODS FOR CONNECTING TO A WIRELESS NETWORK

CROSS-REFERENCE TO RELATED APPLICATIONS

This application is a Continuation of International Application No. PCT/CN2019/126519, filed on Dec. 19, 2019, which claims priority of Chinese Application No. 201910619597.0, filed on Jul. 10, 2019, the contents of which are incorporated herein in its entirety by reference.

TECHNICAL FIELD

The present disclosure generally relates to technical fields of wireless network, and more particularly, to systems and methods for connecting to a wireless network.

BACKGROUND

In a wireless local area network (WLAN) communication, there are usually many channels for establishing connections to different wireless networks. When connecting to a wireless network, a wireless device firstly needs to find out a target channel on which a connection to the wireless network is to be established. In existing methods for determining the target channel, the wireless device often switches different channels for receiving data transmitting on the channels. For example, the wireless device receives data transmitting on a current channel. Only when the data transmitting on the current channel exactly matches a predetermined protocol, the current channel may be determined as the target channel. Otherwise, the wireless device may skip to the next channel until finding out a channel whose data exactly matches the predetermined protocol. However, if the data transmitting on the target channel is lost, out of sequence, or discontinuous, the target channel may be missed. As a result, the wireless device may cost a long time to find out the target channel or even fail to find out the target channel. Thus, it is desirable to provide systems and methods for determining the target channel efficiently.

SUMMARY

An aspect of the present disclosure introduces a system for connecting to a wireless network. The system may include at least one storage medium including a set of instructions for connecting to a wireless network, and at least one processor in communication with the storage medium. When executing the set of instructions, the at least one processor may perform the following operations. The at least one processor may obtain, within a dwell time, at least one packet transmitting on a current channel among a plurality of predetermined channels, wherein the plurality of predetermined channels at least include a target channel on which a connection to the wireless network is to be established; determine a matching score of the current channel based on the at least one packet, wherein the matching score reflects a likelihood that the current channel is the target channel; and determine, based on the matching score, an additional dwell time for continuing dwelling on the current channel to further evaluate the likelihood that the current channel is the target channel.

In some embodiments, to determine the additional dwell time, the at least one processor is directed to: determine whether the matching score satisfies a first predetermined condition; and in response to a determination that the matching score satisfies the first predetermined condition, designate a first time period as the additional dwell time.

In some embodiments, the first predetermined condition is that the matching score equals to a first predetermined value, and the at least one processor is further directed to: determine that the current channel is the target channel.

In some embodiments, the at least one processor is further directed to: in response to a determination that the matching score does not satisfy the first predetermined condition, determine whether the matching score satisfies a second predetermined condition; and in response to a determination that the matching score satisfies the second predetermined condition, determine the additional dwell time based on the matching score.

In some embodiments, the second predetermined condition is that the matching score is greater than a matching threshold, and the additional dwell time has a positive correlation with the matching score.

In some embodiments, the second predetermined condition is that the matching score is not greater than a matching threshold, and the additional dwell time has a negative correlation with the matching score.

In some embodiments, the at least one processor is further directed to: in response to a determination that the matching score does not satisfy the second predetermined condition, designate a second time period as the additional dwell time; and determine that the current channel is not the target channel.

In some embodiments, the at least one processor is further directed to: determine, among the plurality of predetermined channels, whether a next channel of the current channel is the target channel.

In some embodiments, to determine the matching score, the at least one processor is directed to: obtain a length of each of the at least one packet; and determine the matching score based on the length of each of the at least one packet.

In some embodiments, to determine the matching score based on the length of each of the at least one packet, the at least one processor is further directed to: for every two adjacent packets of the at least one packet, determine a length difference between lengths of the two adjacent packets; and determine the matching score based on the length differences.

According to still another aspect of the present disclosure, a method for connecting to a wireless network is provided. The method may include obtaining, within a dwell time, at least one packet transmitting on a current channel among a plurality of predetermined channels, wherein the plurality of predetermined channels at least include a target channel on which a connection to the wireless network is to be established; determining a matching score of the current channel based on the at least one packet, wherein the matching score reflects a likelihood that the current channel is the target channel; and determining, based on the matching score, an additional dwell time for continuing dwelling on the current channel to further evaluate the likelihood that the current channel is the target channel.

According to still another aspect of the present disclosure, a non-transitory computer-readable medium, comprising at least one set of instructions compatible for connecting to a wireless network is provided. When executed by at least one processor of an electrical device, the at least one set of instructions may direct the at least one processor to perform the following operations. The at least one processor may obtain, within a dwell time, at least one packet transmitting on a current channel among a plurality of predetermined channels, wherein the plurality of predetermined channels at least include a target channel on which a connection to the wireless network is to be established; determine a matching score of the current channel based on the at least one packet, wherein the matching score reflects a likelihood that the current channel is the target channel; and determine, based on the matching score, an additional dwell time for continuing dwelling on the current channel to further evaluate the likelihood that the current channel is the target channel.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
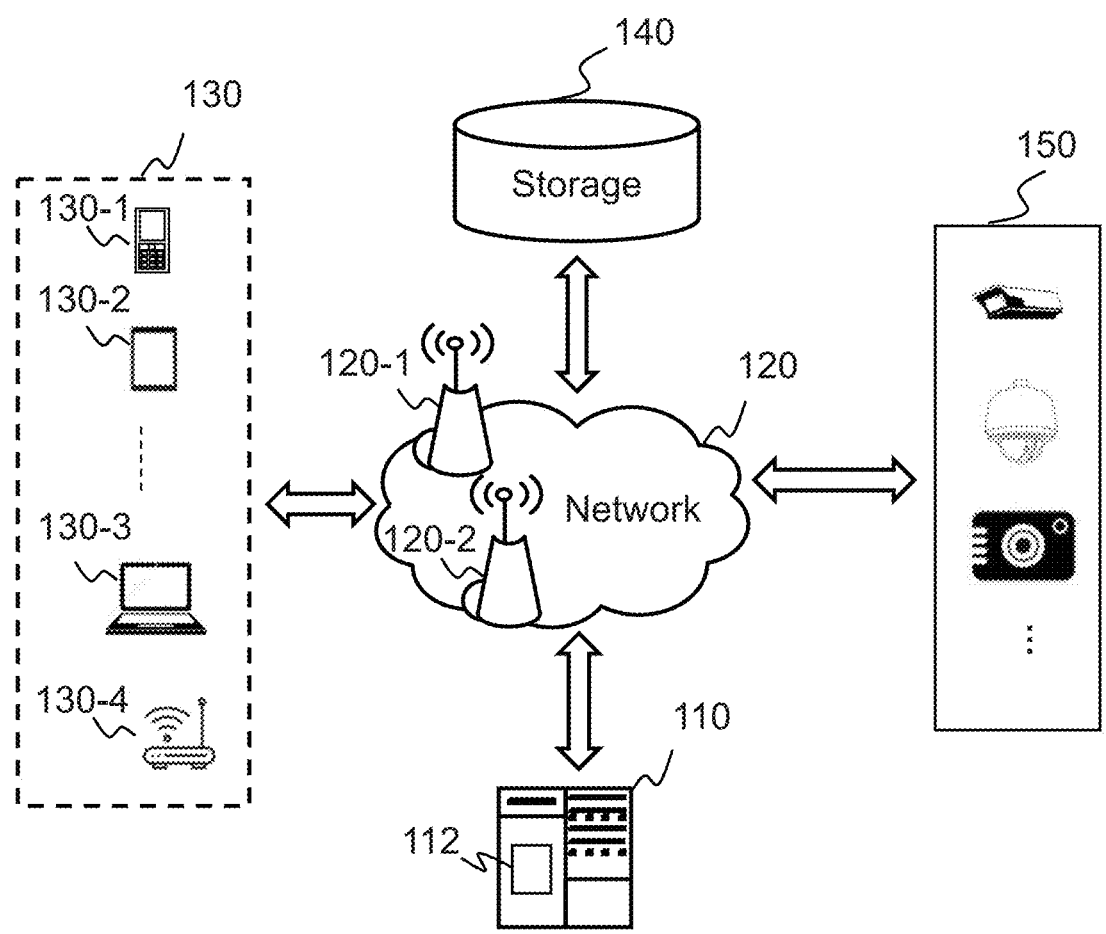
FIG. 1 is a schematic diagram illustrating an exemplary system for connecting to a wireless network according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise.

It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for connecting to a wireless network. When a wireless device connects to a wireless network, the wireless device may firstly find out a target channel on which a connection to the wireless network is to be established. To this end, the systems and methods may determine a likelihood or a probability representing that a current channel is the target channel. The systems and methods may further determine an additional dwell time for continuing dwelling on the current channel based on the likelihood or the probability. During the additional dwell time, the systems and methods may continue dwelling on the current channel to evaluate the likelihood or probability that representing the current channel is the target channel, rather than skipping to another channel when data transmitting on the current channel is not exactly matched with a predetermined protocol. The systems and methods may further determine the additional dwell time based on the likelihood or probability. The greater the likelihood or probability that the current channel is the target channel, the longer the additional dwell time. That is to way, the systems and methods may dwell longer on the current channel when the current channel is more likely to be the target channel. In this way, even if the data transmitting on the target channel is lost, out of sequence, or discontinuous, the target channel may not be missed. The systems and methods may find out the target channel efficiently.

FIG. 1 is a schematic diagram of an exemplary system 100 for connecting to a wireless network according to some embodiments of the present disclosure. The system 100 may include a server 110, a network 120, a first wireless device 130, a storage 140, and a second wireless device 150.

The server 110 may be configured to process information and/or data relating to connecting to a wireless network. For example, the server 110 may determine a matching score representing a likelihood or probability than a channel is a target channel on which a connection to the wireless network is to be established. As another example, the server 110 may determine an additional dwell time for continuing dwelling on the channel to further evaluate the likelihood or probability that the channel is the target channel. As still another example, the server 110 may determine the target channel from a plurality of predetermined channels. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the second wireless device 150, and/or the storage 140 via the network 120. As another example, the server 110 may connect the second wireless device 150, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to connecting to a wireless network. For example, the processing engine 112 may determine a matching score representing a likelihood or probability than a channel is a target channel on which a connection to the wireless network is to be established. As another example, the processing engine 112 may determine an additional dwell time for continuing dwelling on the channel to further evaluate the likelihood or probability that the channel is the target channel. As still another example, the processing engine 112 may determine the target channel from a plurality of predetermined channels. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof.

The network 120 may facilitate the exchange of information and/or data. In some embodiments, one or more components of the system 100 (e.g., the server 110, the first wireless device 130, the second wireless device 150, and the storage 140) may transmit information and/or data to other component(s) in the system 100 via the network 120. For example, the server 110 or the second wireless device 150 may obtain at least one packet transmitting on a current channel via the network 120. As another example, the server 110 may send an additional dwell time for continuing dwelling on the current channel to the second wireless device 150 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The first wireless device 130 may be any electronic device that is capable of wireless communication. For example, the first wireless device 130 may include a mobile device 130-1, a tablet computer 130-2, a computer 130-3, a router 130-4, or the like, or any combination thereof. In some embodiments, the first wireless device 130 may send data on a plurality of predetermined channel. For example, the first wireless device 130 may be installed with an application for controlling the second wireless device 150 to connect to wireless networks. In some embodiments, the first wireless device 130 may further include at least one network port. The at least one network port may be configured to send information to and/or receive information from one or more components in the system 100 (e.g., the server 110, the storage 140, the second wireless device 150) via the network 120. In some embodiments, the first wireless device 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the first wireless device (e.g., at least one packet). As another example, the storage 140 may store data (e.g., an additional dwell time, a target channel, etc.). As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the first wireless device 130, the second wireless device 150) via the at least one network port. One or more components in the system 100 may access the data or instructions stored in the storage 140 via the network 120. In some embodiments, the storage 140 may be directly connected to or communicate with one or more components in the system 100 (e.g., the server 110, the first wireless device 130, the second wireless device 150). In some embodiments, the storage 140 may be part of the server 110.

The second wireless device 150 may be any electronic device that is capable of wireless communication. In some embodiments, the second wireless device 150 may be an electronic device without human-computer interaction interfaces. For example, the second wireless device 150 may include a Wi-Fi camera, a Wi-Fi video recorder, a Wi-Fi appliance (e.g., a Wi-Fi TV, a Wi-Fi washing machine, a Wi-Fi refrigerator, a Wi-Fi light, a Wi-Fi intelligent speaker, etc.), a Wi-Fi vehicle, a Wi-Fi smart wearable device (e.g., a smartwatch, a smart glass, etc.), or the like, or any combination thereof. In some embodiments, the second wireless device 150 may further include at least one network port. The at least one network port may be configured to send information to and/or receive information from one or more components in the system 100 (e.g., the server 110, the storage 140) via the network 120. In some embodiments, the second wireless device 150 may be implemented on a computing device 200 having one or more components illustrated in FIG. 2, or a mobile device 300 having one or more components illustrated in FIG. 3 in the present disclosure.

Figure 2:
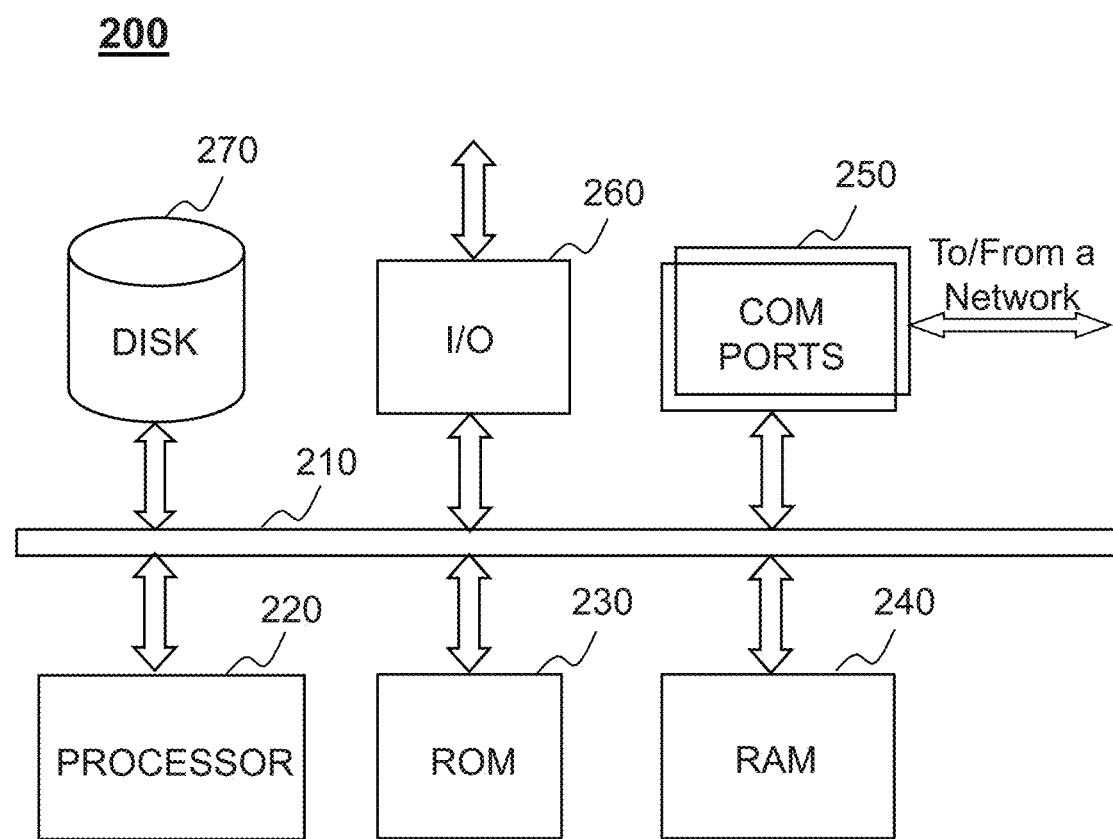
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the second wireless device 150 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that performs one or more functions disclosed in the present disclosure. For example, the processing engine 112 may be implemented on the computing device 200, via its hardware, software program, firmware, or a combination thereof. Although only one such computer is shown, for convenience, the computer functions relating to the wireless network as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the second wireless device 150) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The exemplary computing device may also include operating systems stored in the ROM 230, RAM 240, and/or other type of non-transitory storage medium to be executed by the processor 220. The program instructions may be compatible with the operating systems for controlling to connect to wireless networks. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
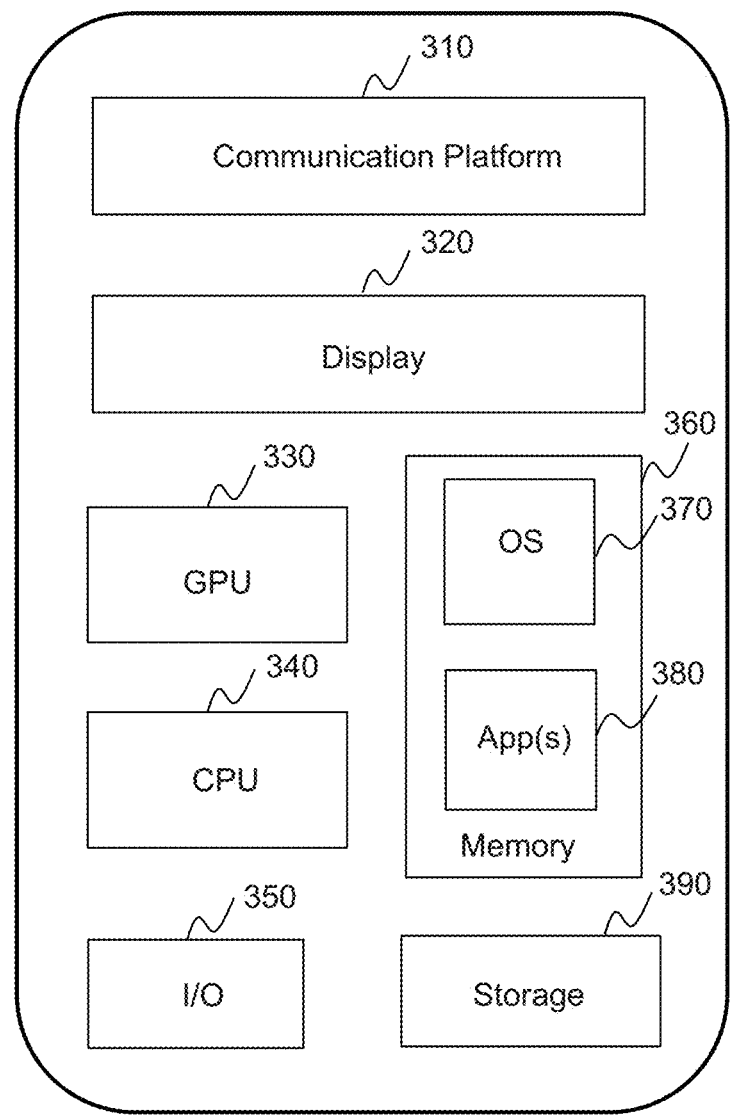
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the second wireless device 150 may be implemented according to some embodiments of the present disclosure.

As illustrated in FIG. 3, the mobile device 300 may include a communication platform 310, a display 320, a graphics processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-7). The hardware elements, operating systems and programming languages of such computers are conventional in nature, and it is presumed that those skilled in the art are adequately familiar therewith to adapt those technologies to select the best facial image of the target human face as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result, the drawings should be self-explanatory.

Figure 4:
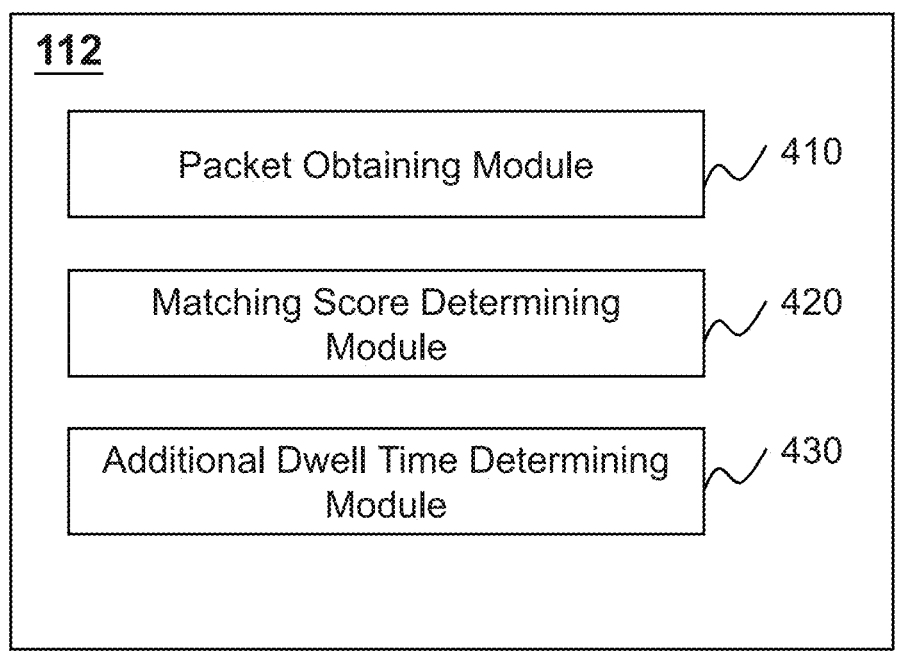
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a packet obtaining module 410, a matching score determining module 420, and an addition dwell time determining module 430.

The packet obtaining module 410 may be configured to obtain one or more packets transmitting on a channel. For example, within a dwell time, the packet obtaining module 410 may obtain at least one packet transmitting on a current channel among a plurality of predetermined channels. As another example, within an additional dwell time, the packet obtaining module 410 may obtain at least one packet transmitting on the current channel.

The matching score determining module 420 may be configured to determine a matching score that represents a likelihood or a probability that a channel is a target channel on which a wireless network is to be established. In some embodiments, the matching score determining module 420 may determine a matching score of the current channel based on the at least one packet obtained from the packet obtaining module 410. For example, the matching score determining module 420 may obtain a length of each of the at least one packet. As another example, for every two adjacent packets of the at least one packet, the matching score determining module 420 may determine a length difference between lengths of the two adjacent packets. As still another example, the matching score determining module 420 may determine the matching score of the current channel based on the length differences.

The addition dwell time determining module 430 may be configured to determine an additional dwell time for continuing dwelling on a channel. In some embodiments, the addition dwell time determining module 430 may determine an additional dwell time of the current channel based on the matching score of the current channel. For example, the addition dwell time determining module 430 may determine whether the matching score of the current channel satisfies a first predetermined condition and/or a second predetermined condition. As another example, the addition dwell time determining module 430 may determine the additional dwell time based on the matching score.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the packet obtaining module 410 and the matching score determining module 420 may be integrated as one module to both determine the matching score and the additional dwell time.

Figure 5:
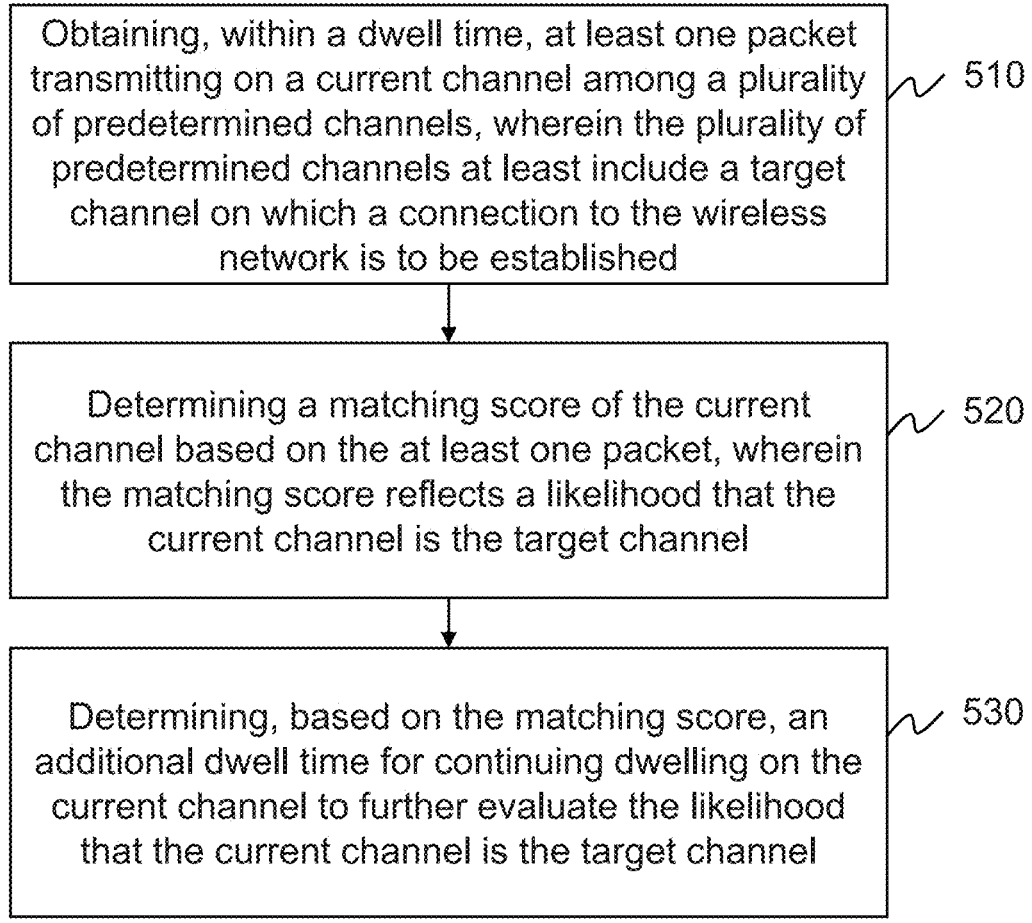
FIG. 5 is a flowchart illustrating an exemplary process for connecting to a wireless network according to some embodiments of the present disclosure.

FIG. 5 is a flowchart illustrating an exemplary process 500 for connecting to a wireless network according to some embodiments of the present disclosure. The process 500 may be executed by the system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the packet obtaining module 410) may obtain, within a dwell time, at least one packet transmitting on a current channel among a plurality of predetermined channels.

In some embodiments, a predetermined channel may be a medium through which wireless data are transmitted. On each of the plurality of predetermined channel, a predetermined range of wireless data may be transmitted. In some embodiments, when connecting to a wireless network, the processing engine 112 may scan one or more of the plurality of predetermined channels and dwell on the one or more predetermined channel to determine which predetermined channel is a target channel. On the target channel, the wireless network is to be established. In some embodiments, the plurality of predetermined channels may at least include a target channel. In some embodiments, a count of the plurality of predetermined channels may be different according to different network standards or different countries. For example, the plurality of predetermined channels may be 11, 13, 14, etc.

In some embodiments, the dwell time may be a default time period that the processing engine 112 dwells on a predetermined channel. During the default time period, the processing engine 112 may obtain data transmitting on the predetermined channel to determine whether the predetermined channel is the target channel. In some embodiments, the dwell time may be a default time period and stored in a storage device (e.g., the storage 140, the ROM 230 or the RAM 240, etc.). For example, the dwell time may be 100 ms, 200 ms, 300 ms, etc. As another example, the dwell time may be determined by an operator of the system 100 according to different scenarios (e.g., different wireless networks, different counts of predetermined channels, etc.). In some embodiments, the dwell time on each of the plurality of predetermined channels may be the same or may be different from each other.

In some embodiments, a packet of the at least one packet may be a formatted unit of data. In some embodiments, the packet may include an address (e.g., a source address of a sending terminal, a destination address of a receiving terminal), a length of the packet, a hop limit, a payload, or the like, or any combination thereof. In some embodiments, within the dwell time, the processing engine 112 may dwell on the current channel to obtain the at least one packet transmitting on the current channel continuously. The at least one packet may have a time sequence.

In 520, the processing engine 112 (e.g., the processor 220, the matching score determining module 420) may determine a matching score of the current channel based on the at least one packet.

In some embodiments, the matching score may be used to evaluate a matching degree that the at least one packet transmitting on the current channel matches with wireless data which is to be transmitted on the target channel. The matching score may reflect a likelihood or a probability that the current channel is the target channel. For example, the greater the matching score, the more likely or the higher probability that the current channel is the target channel. As another example, the greater the matching score, the less likely or the lower probability that the current channel is the target channel. In some embodiments, the matching score may be represented as a number, a percentage, a fraction, or the like, or any combination thereof.

In some embodiments, the processing engine 112 may determine the matching score based on the at least one packet transmitting on the current channel. In some embodiments, the first wireless device 130 may send at least one target packet of the wireless network on the target channel. The at least one target packed (e.g., an address in each of the at least one target packet, a length of each packet, a hop limit of each packet, a payload of each packet, etc.) may satisfy a predetermined protocol. The processing engine 112 may determine whether the at least one packet transmitting on the current channel satisfies the predetermined protocol according to a method or an algorithm. In some embodiments, the processing engine 112 may determine the matching score of the current channel according to the predetermined protocol of the length of each of the at least one packet. The length of each of the at least one target packets may satisfy a predetermined length condition. For example, the predetermined length condition may include that each of the at least one packet has the same length. As another example, the predetermined length condition may include that every two adjacent packets have a predetermined length difference (e.g., 1, 2, 3, m, wherein m is a positive integer). As still another example, the predetermined length condition may include that each of the at least one packet has a predetermined length. In some embodiments, the method for determining the matching score of the current channel may be found elsewhere (e.g., FIG. 6 and the descriptions thereof) in the present disclosure. In some embodiments, the processing engine 112 may determine the matching score according to the predetermined protocol of the payload included in each of the at least one packet. For example, the payload of each of the at least one target packet may satisfy a predetermined payload condition.

In 530, the processing engine 112 (e.g., the processor 220, the additional dwell time determining module 430) may determine an additional dwell time based on the matching score.

In some embodiments, the additional dwell time may be an additional time period that the processing engine 112 will cost for continuing dwelling on the current channel to further evaluate the likelihood or the probability that the current channel is the target channel. During the additional dwell time after the default dwell time, the processing engine 112 will continue dwelling on the current channel to obtain more packets transmitting on the current channel rather than skipping to another channel among the plurality of predetermined channels. In some embodiments, the processing engine 112 may further use the obtained more packets to further evaluate the likelihood or the probability that the current channel is the target channel according to the method described in the present disclosure.

In some embodiments, the processing engine 112 may determine the addition dwell time based on the matching score. For example, the processing engine 112 may predetermine or establish a table or a chart reflecting a relationship between the matching score and the additional dwell time. In the table or the chart, each matching score may have a corresponding additional dwell time. In some embodiments, the table or the chart may be predetermined (e.g., according to empirical values) and stored in a storage device (e.g., the storage 140, the ROM 230 or the RAM 240, etc.). The processing engine 112 may access the storage device and look up the table or the chart to find out the addition dwell time corresponding to the matching score. As another example, the processing engine 112 may pre-train a machine learning model for predicting an additional dwell time under a given matching score. The processing engine 112 may input the determined matching score into the machine learning model, and the machine learning model may output the additional dwell time. In some embodiments, the machine learning model may be trained by the processing engine with a plurality of historical data, and stored in a storage device (e.g., the storage 140, the ROM 230 or the RAM 240, etc.). As still another example, the method for determining the dwell time may be found elsewhere (e.g., FIG. 7 and the descriptions thereof) in the present disclosure.

In some embodiments, the processing engine 112 may determine the matching score for evaluating the likelihood of probability that the current channel is the target channel rather than directly determining whether the current channel is the target channel or not. The greater the likelihood or probability that the current channel is the target channel, the longer the processing engine 112 may dwell on the current channel to continue obtaining more packet transmitting on the current channel. In this way, even if the at least one packet transmitting on the current channel is lost, out of sequence, or discontinuous, the processing engine 112 may find out the target channel efficiently.

It should be noted that the above description is merely provided for the purposes of illustration, and not intended to limit the scope of the present disclosure. For persons having ordinary skills in the art, multiple variations and modifications may be made under the teachings of the present disclosure. For example, the process 500 may further include an operation for determining the target channel after determining the additional dwell time.

Figure 6:
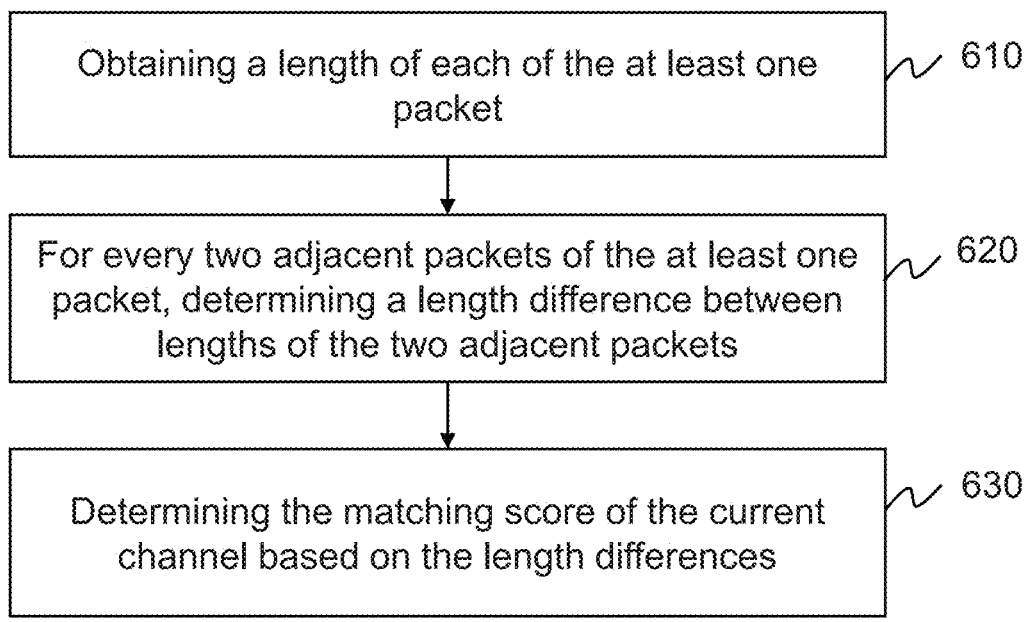
FIG. 6 is a flowchart illustrating an exemplary process for determining a matching score according to some embodiments of the present disclosure.

FIG. 6 is a flowchart illustrating an exemplary process 600 for determining a matching score of a current channel according to some embodiments of the present disclosure. The process 600 may be executed by the system 100. For example, the process 600 may be implemented as a set of instructions (e.g., an application) stored in the storage ROM 230 and/or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the matching score determining module 420) may obtain a length of each of the at least one packet.

In some embodiments, each of the at least one packet may include an address (e.g., a source address of a sending terminal, a destination address of a receiving terminal), a length of the packet, a hop limit, a payload, or the like, or any combination thereof. In some embodiments, the length of the packet may be implied by a duration of transmission of the packet. The processing engine 112 may obtain the length of each packet when obtaining the at least one packet transmitting on the current channel.

In 620, for every two adjacent packets of the at least one packet, the processing engine 112 (e.g., the processor 220, the matching score determining module 420) may determine a length difference between lengths of the two adjacent packets.

In some embodiments, the processing engine 112 may obtain the at least one packet according to a time sequence. The two adjacent packets may refer to two consecutive packets in the time sequence. For example, the processing engine 112 may obtain n+1 packets, wherein n is an integer greater than 0. The length of each of the at least one packets in the time sequence may be $x_0, x_1, x_2 \ldots x_n$, respectively. The length difference between lengths of two adjacent packets may be $|x_{i+1}-x_i|$, wherein i is an integer.

In 630, the processing engine 112 (e.g., the processor 220, the matching score determining module 420) may determine the matching score of the current channel based on the length differences.

In some embodiments, the processing engine 112 may determine the matching score based on the length differences according to a predetermined length condition. For example, the predetermined length condition may include that each of the length differences is a predetermined difference value. The predetermined difference value may be predetermined by an operator of the system 100 or the first wireless device 130, and stored in a storage device (e.g., the storage 140, the ROM 230 or the RAM 240, etc.). For example, the predetermined difference value may be 0, 1, 2, 3, etc. In some embodiments, the processing engine 112 may determine the matching score based on the length differences according to a predetermined algorithm. For example, the processing engine 112 may determine the matching score according to Equation (1):

$$m = \sum_{i=0}^{n-1} (x_{i+1} - x_i - a)^2, \tag{1}$$

wherein m denotes the matching score of the current channel, a denotes a predetermined difference value, and n+1 denotes a count of the at least one packets on the current channel, wherein a is an integer and n is a positive integer. For example, the predetermined difference value a is 1. Within the dwell time, the processing engine 112 obtain five packets $x_0, x_1, x_2, x_3, x_4$ transmitting on the current channel. The length of each of the five packets of a current channel 1 is 1, 2, 2, 5, and 6, respectively. The processing engine 112 may determine the matching score of the current channel 1 according to Equation (1) as m=0+1+4+0=5. As another example, the length of each of the five packets of a current channel 2 is 1, 5, 7, 8, and 2, respectively. The processing engine 112 may determine the matching score of the current channel 2 according to Equation (1) as m=16+1+0+25=42.

As still another example, the length of each of the five packets of a current channel 3 is 4, 5, 6, 7, and 8, respectively. The processing engine 112 may determine the matching score of the current channel 3 according to Equation (1) as m=0+0+0+0=0. As still another example, the length of each of the five packets of a current channel 4 is 1, 4, 7, 10 and 10, respectively. The processing engine 112 may determine the matching score of the current channel 4 according to Equation (1) as m=4+4+4+1=13.

It should be noted that the matching score determined according to Equation (1) is merely for illustration purposes, the matching score may be defined in any other ways. For example, the processing engine 112 may determine the matching score according to Equation (2):

$$m = \left[ 100 - \sum_{i=0}^{n-1} (x_{i+1} - x_i - a)^2 \right] / 100, \tag{2}$$

for example, the matching score of the current channel 1 is m=(100−5)/100=95%; the matching score of the current channel 2 is m=(100−42)/100=58%; the matching score of the current channel 3 is m=(100−0)/100=100%; and the matching score of the current channel 4 is m=(100−13)/100=87%.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600. For example, after determining the matching score, the processing engine 112 may store the matching score of the current channel in a storage device (e.g., the storage 140, the ROM 230 or the RAM 240, etc.). As another example, the method for determining the matching score is merely for illustration for purposes, other methods do not depart from the scope of the present disclosure.

Figure 7:
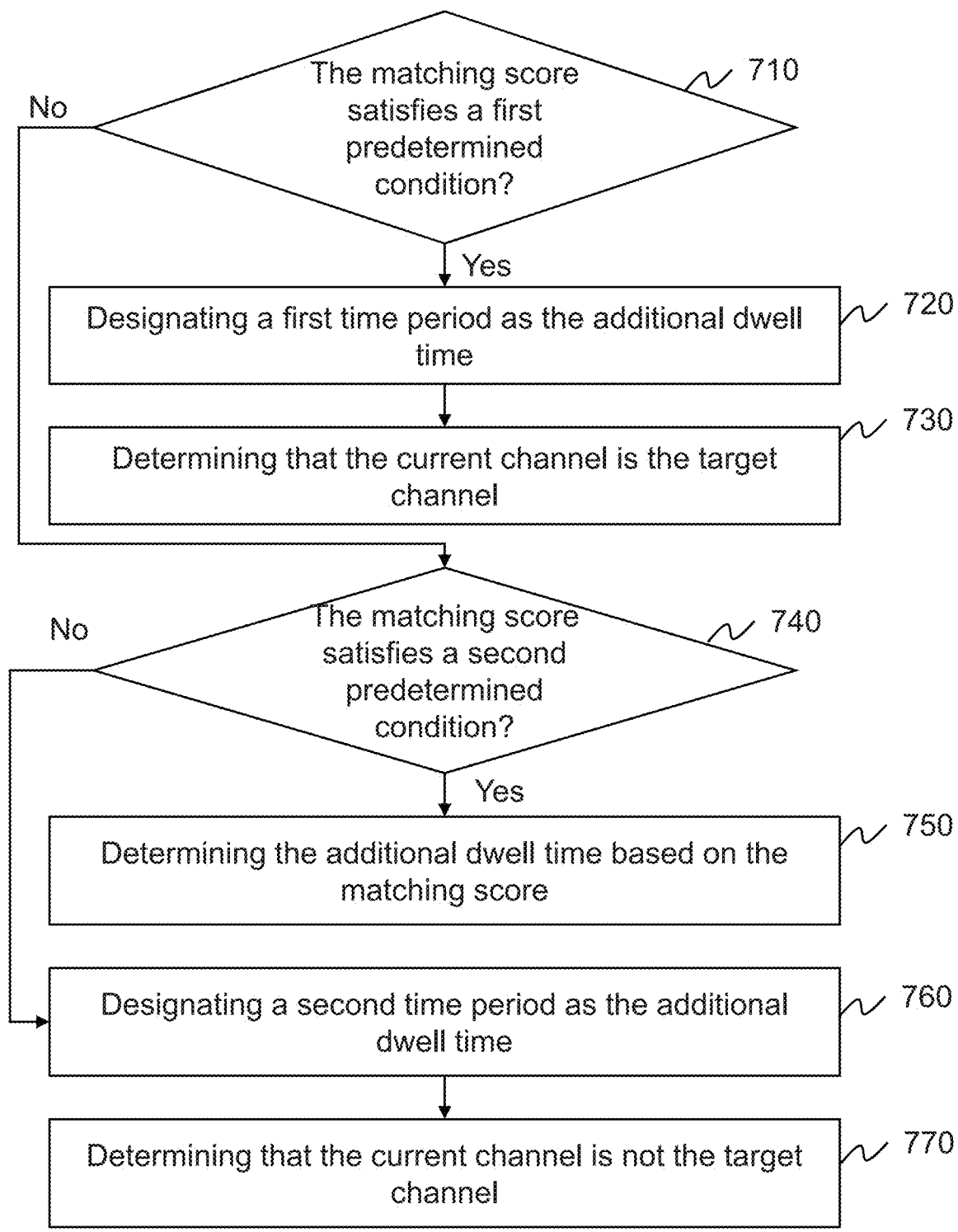
FIG. 7 is a flowchart illustrating an exemplary process for determining an additional dwell time according to some embodiments of the present disclosure.

FIG. 7 is a flowchart illustrating an exemplary process 700 for determining an additional dwell time according to some embodiments of the present disclosure. The process 700 may be executed by the system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the addition dwell time determining module 430) may determine whether the matching score satisfies a first predetermined condition.

In some embodiments, the first predetermined condition may be used to determine whether the current channel is the target channel. In some embodiments, the first predetermined condition may be predetermined by an operator of the system 100 and stored in a storage device (e.g., the storage 140, the ROM 230 or the RAM 240, etc.). For example, the first predetermined condition may be that the matching score is greater (or less) than a first predetermined threshold. For example, if the matching score of the current channel is greater (or less) than the first predetermined threshold, the processing engine 112 may determine that the current channel is the target channel. In some embodiments, the first predetermined threshold may be a default value and stored in a storage device (e.g., the storage 140, the ROM 230 or the RAM 240, etc.). For example, the first predetermined threshold may be 5, 10, 90%, 80%, etc. As another example, the first predetermined condition may be that the matching score is equal to a first predetermined value. For example, if the matching score of the current channel is equal to the first predetermined value, the processing engine 112 may determine that the current channel is the target channel. In some embodiments, the first predetermined value may be a default value and stored in a storage device (e.g., the storage 140, the ROM 230 or the RAM 240, etc.). For example, the first predetermined value may be 0, 100%, etc.

In 720, in response to a determination that the matching score of the current channel satisfies the first predetermined condition, the processing engine 112 (e.g., the processor 220, the addition dwell time determining module 430) may designate a first time period as the additional dwell time. In 730, the processing engine 112 (e.g., the processor 220, the addition dwell time determining module 430) may determine that the current channel is the target channel.

In some embodiments, in response to the determination that the matching score satisfies the first predetermined condition, the processing engine 112 may determine that the current channel is the target channel, and the processing engine may not need to dwell on the current channel. The processing engine 112 may designate the first time period as the additional dwell time. For example, the first time period may be 0 ms. As another example, the processing engine 112 may further dwell the first time period on the current channel to verify whether the current channel is the target channel. The first time period may be greater than 0 ms, for example, 100 ms, 200 ms, 300 ms, etc.

In 740, in response to a determination that the matching score of the current channel does not satisfy the first predetermined condition, the processing engine 112 (e.g., the processor 220, the addition dwell time determining module 430) may determine whether the matching score satisfies a second predetermined condition.

In some embodiments, the second predetermined condition may be used to determine whether the current channel has the probability to be the target channel. In some embodiments, the second predetermined condition may be predetermined by an operator of the system 100 and stored in a storage device (e.g., the storage 140, the ROM 230 or the RAM 240, etc.). For example, the second predetermined condition may be that the matching score is greater than a matching threshold. For example, if the matching score of the current channel is greater than the matching threshold, the processing engine 112 may determine that the current channel is more likely to be the target channel. In some embodiments, the matching threshold may be a default value and stored in a storage device (e.g., the storage 140, the ROM 230 or the RAM 240, etc.). For example, the matching threshold may be 5, 10, 15, 20, etc. As another example, the second predetermined condition may be that the matching score is less than a matching threshold. For example, if the matching score of the current channel is less than the matching threshold, the processing engine 112 may determine that the current channel is likely to be the target channel. In some embodiments, the matching threshold may be a default value and stored in a storage device (e.g., the storage 140, the ROM 230 or the RAM 240, etc.). For example, the matching threshold may be 80%, 85%, 90%, 95%, etc.

In 750, in response to a determination that the matching score of the current channel satisfies the second predetermined condition, the processing engine 112 (e.g., the processor 220, the addition dwell time determining module 430) may determine the additional dwell time based on the matching score.

In some embodiments, in response to the determination that the matching score of the current channel satisfies the second predetermined condition, the processing engine 112 may determine that the current channel is likely to be the target channel. The processing engine 112 may continue dwelling on the current channel to further evaluate the likelihood or probability that the current channel is the target channel. In some embodiments, the additional dwell time may be associated with the matching score. For example, the more likely that the current channel is the target channel, the processing engine 112 may continue dwell more time on the current channel.

In some embodiments, if the second predetermined condition is that the matching score is not greater than the matching threshold, the additional dwell time may have a negative correlation with the matching score. The addition dwell time increases with the decreasing of the matching score. For example, the matching threshold is 15, and the matching score determined according to Equation (1) of the current channel 1 (m=5), the current channel 2 (m=42), the current channel 3 (m=0), and the current channel 4 (m=13) described at operation 630 in FIG. 6 may be compared with the matching threshold, respectively. The processing engine 112 may determine that the current channel 1 and the current channel 4 satisfy the second predetermined condition. The processing engine 112 may determine that the current channel 1 is more likely to be the target channel than the current channel 4. The additional dwell time of current channel 1 may be greater than the current channel 4. For example, the processing engine 112 may determine that the additional dwell time of the current channel 1 is 200 ms, and the addition dwell time of the current channel 4 is 150 ms.

In some embodiments, if the second predetermined condition is that the matching score is greater than the matching threshold, the additional dwell time may have a positive correlation with the matching score. The addition dwell time increases with the increasing of the matching score. For example, the matching threshold is 85%, and the matching score determined according to Equation (2) of the current channel 1 (m=95%), the current channel 2 (m=458%), the current channel 3 (m=100%), and the current channel 4 (m=87%) described at operation 630 in FIG. 6 may be compared with the matching threshold, respectively. The processing engine 112 may determine that the current channel 1 and the current channel 4 satisfy the second predetermined condition. The processing engine 112 may determine that the current channel 1 is more likely to be the target channel than the current channel 4. The additional dwell time of current channel 1 may be greater than the current channel 4. For example, the processing engine 112 may determine that the additional dwell time of the current channel 1 is 200 ms, and the addition dwell time of the current channel 4 is 150 ms.

In some embodiments, the processing engine 112 may determine the additional dwell time according to an algorithm, a chart, a table, a matching learning method, or the like, or any combination thereof. For example, the processing engine 112 may predetermine or establish a table or a chart reflecting a relationship between the matching score and the additional dwell time. In the table or the chart, each matching score may have a corresponding additional dwell time. In some embodiments, the table or the chart may be predetermined (e.g., according to empirical values) and stored in a storage device (e.g., the storage 140, the ROM 230 or the RAM 240, etc.). The processing engine 112 may access the storage device and look up the table or the chart to find out the addition dwell time corresponding to the matching score. As another example, the processing engine 112 may pre-train a machine learning model for predicting an additional dwell time under a given matching score. The matching learning model may be pre-trained and stored in a storage device (e.g., the storage 140, the ROM 230 or the RAM 240, etc.). The processing engine 112 may input the determined matching score into the machine learning model, and the machine learning model may output the additional dwell time. In some embodiments, the machine learning model may be trained by the processing engine with a plurality of historical data, and stored in a storage device (e.g., the storage 140, the ROM 230 or the RAM 240, etc.). As still another example, an algorithm reflecting a relationship between the matching score and the additional dwell time may be determined by an operator of the system 100 according to empirical values and stored in a storage device (e.g., the storage 140, the ROM 230 or the RAM 240, etc.). The processing engine 112 may calculate the addition dwell time of the current channel according to the algorithm.

In some embodiments, during the additional dwell time, the processing engine 112 may further dwell on the current channel and evaluate whether the current channel is the target channel according to the methods according to the present disclosure. For example, within the additional dwell time, the processing engine 112 may further obtain at least one packet transmitting on the current channel, and determine a matching score of the current channel. The processing engine 112 may further determine whether the current channel is the target channel based on the first predetermined condition, or determine another additional dwell time on the current channel based on the matching score.

In 760, in response to a determination that the matching score of the current channel does not satisfy the second predetermined condition, the processing engine 112 (e.g., the processor 220, the addition dwell time determining module 430) may designate a second time period as the additional dwell time. In 770, the processing engine 112 (e.g., the processor 220, the addition dwell time determining module 430) may determine that the current channel is not the target channel.

In some embodiments, in response to the determination that the matching score does not satisfy the second predetermined condition, the processing engine 112 may determine that the current channel is not the target channel, and the processing engine may not need to dwell on the current channel. The processing engine 112 may designate the second time period as the additional dwell time. For example, the second time period may be 0 ms.

In some embodiments, after a determination that the current channel is not the target channel, the processing engine 112 may further determine, among the plurality of predetermined channels, whether a next channel of the current channel is the target channel. For example, the processing engine 112 may skip to the next channel. The next channel may be a new current channel, and the processing engine 112 may determine whether the new current channel is the target channel according to methods described in the present disclosure (e.g., FIGS. 5-7 and the descriptions thereof).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700. For example, the processing engine may determine whether the matching score of the current channel satisfies the second predetermined condition (operation 740) before determining whether the matching score satisfies the first predetermined condition (operation 710). For example, only when the current channel is likely to be the target channel, the processing engine 112 may determine whether the current channel satisfies the first predetermined condition (whether the current channel is the target channel).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1200.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for connecting to a wireless network, comprising:
  at least one storage medium including a set of instructions for connecting to the wireless network; and
  at least one processor in communication with the storage medium, wherein when executing the set of instructions, the at least one processor is directed to:
    obtain, by the at least one processor, within a dwell time, at least one packet transmitting on a current channel among a plurality of predetermined channels, wherein the plurality of predetermined channels at least include a target channel on which a connection to the wireless network is to be established;
    determine, by the at least one processor, a matching score of the current channel based on a length difference between lengths of two adjacent packets of the at least one packet, wherein the matching score reflects a likelihood that the current channel is the target channel; and
    determine, by the at least one processor, based on the matching score, an additional dwell time for continuing dwelling on the current channel to further evaluate the likelihood that the current channel is the target channel.

2. The system of claim 1, wherein to determine, by the at least one processor, the additional dwell time, the at least one processor is directed to:
   determine, by the at least one processor, whether the matching score satisfies a first predetermined condition; and
   in response to a determination that the matching score satisfies the first predetermined condition, designate, by the at least one processor, a first time period as the additional dwell time.

3. The system of claim 2, wherein the first predetermined condition is that the matching score equals to a first predetermined value, and the at least one processor is further directed to:
   determine, by the at least one processor, that the current channel is the target channel.

4. The system of claim 2, wherein the at least one processor is further directed to:
   in response to a determination that the matching score does not satisfy the first predetermined condition, determine, by the at least one processor, whether the matching score satisfies a second predetermined condition; and
   in response to a determination that the matching score satisfies the second predetermined condition, determine, by the at least one processor, the additional dwell time based on the matching score.

5. The system of claim 4, wherein the second predetermined condition is that the matching score is greater than a matching threshold, and the additional dwell time has a positive correlation with the matching score.

6. The system of claim 4, wherein the second predetermined condition is that the matching score is not greater than a matching threshold, and the additional dwell time has a negative correlation with the matching score.

7. The system of claim 4, wherein the at least one processor is further directed to:
   in response to a determination that the matching score does not satisfy the second predetermined condition, designate, by the at least one processor, a second time period as the additional dwell time; and
   determine, by the at least one processor, that the current channel is not the target channel.

8. The system of claim 7, wherein the at least one processor is further directed to:
   determine, by the at least one processor, among the plurality of predetermined channels, whether a next channel of the current channel is the target channel.

9. The system of claim 1, wherein to determine the matching score, the at least one processor is directed to:
   obtain, by the at least one processor, a length of each of the at least one packet; and
   determine, by the at least one processor, the matching score based on the length of each of the at least one packet.

10. The system of claim 9, wherein to determine the matching score based on the length of each of the at least one packet, the at least one processor is further directed to:
    for every two adjacent packets of the at least one packet, determine, by the at least one processor, the length difference between lengths of the two adjacent packets; and
    determine, by the at least one processor, the matching score based on the length differences.

11. A method for connecting to a wireless network, implemented on a system including at least one storage medium including a set of instructions for connecting to the wireless network; and at least one processor in communication with the storage medium, the method comprising:
    obtaining, by the at least one processor, within a dwell time, at least one packet transmitting on a current channel among a plurality of predetermined channels, wherein the plurality of predetermined channels at least include a target channel on which a connection to the wireless network is to be established;
    determining, by the at least one processor, a matching score of the current channel based on a length difference between lengths of two adjacent packets of the at least one packet, wherein the matching score reflects a likelihood that the current channel is the target channel; and
    determining, by the at least one processor, based on the matching score, an additional dwell time for continuing dwelling on the current channel to further evaluate the likelihood that the current channel is the target channel.

12. The method of claim 11, wherein the determining, by the at least one processor, the additional dwell time includes:
    determining, by the at least one processor, whether the matching score satisfies a first predetermined condition; and
    in response to a determination that the matching score satisfies the first predetermined condition, designating, by the at least one processor, a first time period as the additional dwell time.

13. The method of claim 12, wherein the first predetermined condition is that the matching score equals to a first predetermined value, and the method further includes:
    determining, by the at least one processor, that the current channel is the target channel.

14. The method of claim 12, further comprising:
    in response to a determination that the matching score does not satisfy the first predetermined condition, determining, by the at least one processor, whether the matching score satisfies a second predetermined condition; and
    in response to a determination that the matching score satisfies the second predetermined condition, determining, by the at least one processor, the additional dwell time based on the matching score.

15. The method of claim 14, wherein the second predetermined condition is that the matching score is greater than a matching threshold, and the additional dwell time has a positive correlation with the matching score.

16. The method of claim 14, wherein the second predetermined condition is that the matching score is not greater than a matching threshold, and the additional dwell time has a negative correlation with the matching score.

17. The method of claim 14 further comprising:
    in response to a determination that the matching score does not satisfy the second predetermined condition, designating, by the at least one processor, a second time period as the additional dwell time; and
    determining, by the at least one processor, that the current channel is not the target channel.

18. The method of claim 17, further comprising:
    determining, by the at least one processor, among the plurality of predetermined channels, whether a next channel of the current channel is the target channel.

19. The method of claim 11, wherein the determining, by the at least one processor, the matching score includes:

determining, by the at least one processor, a length of each of the at least one packet;

for every two adjacent packets of the at least one packet, determining, by the at least one processor, the length difference between lengths of the two adjacent packets; and determining, by the at least one processor, the matching score based on the length differences.

20. A non-transitory readable medium, comprising at least one set of instructions for connecting to a wireless network, wherein when executed by at least one processor of an electrical device, the at least one set of instructions directs the at least one processor to perform a method, the method comprising:

obtaining, by the at least one processor, within a dwell time, at least one packet transmitting on a current channel among a plurality of predetermined channels, wherein the plurality of predetermined channels at least include a target channel on which a connection to the wireless network is to be established;

determining, by the at least one processor, a matching score of the current channel based on a length difference between lengths of two adjacent packets of the at least one packet, wherein the matching score reflects a likelihood that the current channel is the target channel; and determining, by the at least one processor, based on the matching score, an additional dwell time for continuing dwelling on the current channel to further evaluate the likelihood that the current channel is the target channel.

* * * * *